(12) United States Patent
Accard et al.

(10) Patent No.: US 7,590,318 B2
(45) Date of Patent: Sep. 15, 2009

(54) OPTOELECTRONIC COMPONENT COMPRISING A DIFFRACTION GRATING WITH A TRANSVERSE STRUCTURE

(75) Inventors: Alain Accard, Marcoussis (FR); Olivier Drisse, Itteville (FR); Béatrice Dagens, Antony (FR); Hélène Sillard, Le Chesnay (FR)

(73) Assignees: Alcatel Lucent (FR); Thales (FR)

( * ) Notice: Subject to any disclaimer, the term of this patent is extended or adjusted under 35 U.S.C. 154(b) by 0 days.

(21) Appl. No.: 11/963,674

(22) Filed: Dec. 21, 2007

(65) Prior Publication Data
US 2008/0193084 A1 Aug. 14, 2008

(30) Foreign Application Priority Data
Dec. 22, 2006 (FR) .................................. 06 55910

(51) Int. Cl.
*G02B 6/34* (2006.01)
(52) U.S. Cl. .............................. 385/37; 385/15; 385/31
(58) Field of Classification Search ................... 385/15, 385/31, 37
See application file for complete search history.

(56) References Cited

U.S. PATENT DOCUMENTS

| 5,337,183 | A | * | 8/1994 | Rosenblatt ................... 359/248 |
| 5,668,900 | A | | 9/1997 | Little et al. |
| 2002/0061046 | A1 | | 5/2002 | Takiguchi et al. |
| 2004/0037342 | A1 | | 2/2004 | Blauvelt et al. |
| 2006/0140535 | A1 | | 6/2006 | Tsuda et al. |

* cited by examiner

*Primary Examiner*—Jennifer Doan
(74) *Attorney, Agent, or Firm*—Lowe Hauptman Ham & Berner, LLP

(57) ABSTRACT

The field of the invention is that of optoelectronic components with a buried stripe structure. The optoelectronic device according to the invention is a stripe structure, comprising at least one buried waveguide and a layer called a grating layer in the form of an elongate stripe comprising features, each feature having an approximately rectangular shape, the length of the feature being substantially perpendicular to the direction of the length of the stripe of the grating layer, the layer being placed so as to provide optical coupling with an optical wave propagating in the waveguide, the length of certain features being substantially less than the width of the waveguide.

11 Claims, 8 Drawing Sheets

Step 1

Step 2

Step 3

Step 1

Step 2

Step 3

OPTOELECTRONIC COMPONENT COMPRISING A DIFFRACTION GRATING WITH A TRANSVERSE STRUCTURE

RELATED APPLICATIONS

The present application is based on, and claims priority from, French Application Number 06 55910, filed Dec. 22, 2006, the disclosure of which is hereby incorporated by reference herein in its entirety.

FIELD OF THE INVENTION

The field of the invention is that of optoelectronic components. The invention is applicable to and suitable for a large number of structures. It applies in particular to what are called BRS structures.

DESCRIPTION OF THE PRIOR ART

Many optoelectronic components are produced in various technologies, including that called BRS (the acronym for Buried Ridge Stripe), which means that they possess a structure known as buried stripe and incorporate, along a monomode waveguide, a gain-coupling or index-coupling diffraction grating. In particular, mention may be made of lasers called DFB (distributed feedback) lasers, distributed Bragg grating components called DBRs (distributed Bragg reflectors), optical amplifiers called SOAs (semiconductor optical amplifiers) and optical filters.

The components of this type are generally produced by means of a process that comprises three main broad steps, denoted 1, 2 and 3, these being shown in FIG. 1. In general, owing to the size of these components, a large number of them are produced simultaneously. Thus, FIG. 1 shows the production of three components. The figures show the components in top view and in cross-sectional view, the cross section being in the plane of section conventionally indicated by a vertical dotted line and two horizontal straight arrows.

In the first step, a layer 2 constituting the future monomode optical waveguide is produced on a substrate 1. This first layer is then covered with a second layer 3 which, once it has been etched, constitutes the Bragg grating 4.

In the second step, a combination of the two layers 2 and 3 is written or etched so as to define the width of the waveguide and of the Bragg grating that covers it. This step is also illustrated in FIG. 2, which shows a perspective view of part of the component at this stage of the production. In this figure, the grating 4 has a "top-hat" profile.

In the third and final step, epitaxial regrowth of a suitable material is carried out so as to bury the waveguide. Thus, optical guiding and electrical injection may be provided.

This process has a major drawback, since, as may be seen in FIG. 1, the zones having gratings must be wide enough to allow realignment of the waveguide by photolithography. It is estimated that this tolerance is of the order of one micron. This technique therefore does not allow any variation in the grating along a transverse axis of the waveguide. It is only possible to modulate the pitch of the grating longitudinally, by playing either with variations in the thickness of the layers defined during epitaxy of the structure, or variations in the open aperture ratio of the grating, which are defined when writing or etching the grating.

Now, the interaction between the optical mode and the grating determines the essential optical properties of the component, such as the spectral selectivity. More precisely, the spectral properties depend on the position and the shape of this grating relative to the waveguide. Furthermore, with this process of the prior art, the properties and optical characteristics of the components obtained are necessarily limited.

One possible solution for remedying the above drawbacks consists in producing "ridge" structures as illustrated in FIG. 3. In this case, the grating 4 is etched not above the waveguide but transversely, perpendicular to the mean plane of the waveguide. In this way it is possible to achieve a degree of control of the transverse shape of the grating. However, these particular structures, which have been employed for producing diode lasers, also have a number of drawbacks. This is because it is necessary to etch layers deeply, as may be seen in FIG. 3, the thickness to be etched being about ten times greater than that of conventional BRS structures. Of course, the coupling with the optical mode propagating in the waveguide is exclusively lateral, resulting in a low modulation of the coupling coefficient. Furthermore, it is technically impossible to etch the grating over the entire width of the stripe in the laser section. Finally, electrical injection is penalized, involving a high series resistance and a low emission power.

SUMMARY OF THE INVENTION

The object of the invention is to improve the performance or to obtain novel functionalities by means of novel types of gratings preferentially integrated into BRS structures, but also being suitable for any other type of stripe structure. In general, these novel gratings possess a pitch that can vary along at least one axis perpendicular to the direction of the waveguide. A production process for producing these novel structures is proposed.

More precisely, the subject of the invention is an optoelectronic device comprising at least one buried waveguide in the form of an elongate stripe and a layer called a grating layer, also in the form of an elongate stripe comprising features, each feature having an approximately rectangular shape, the length of the feature being substantially perpendicular to the direction of the length of the stripe of the grating layer, said layer being placed so as to provide optical coupling with an optical wave propagating in the waveguide, characterized in that the length of certain features is substantially less than the width of the waveguide.

Advantageously, the features are recesses produced within the grating layer or on the periphery of the grating layer, the layer thus having indentations.

Advantageously, the features are of variable size and are placed symmetrically or asymmetrically with respect to the central axis of the grating layer.

Advantageously, the grating layer comprises at least one row of features, the axis of said row being parallel to the central axis of the grating layer or the grating layer may also comprise at least two or three rows of features, the axes of said rows being parallel to the central axis of the grating layer.

Advantageously, the features of all the rows are of identical shape.

Advantageously, the pitch separating two consecutive features is constant in each row or the pitch separating two consecutive features of a first row is different from the pitch separating two consecutive features of a second row.

The invention also relates to a process for producing a device according to one of the preceding claims, which includes a substrate, the process comprising at least the following three steps:

deposition of the waveguide layer on the substrate, deposition of the grating layer and then etching of the grating;

protection of the grating region and continuation of the etching of the waveguide down to the substrate; and epitaxial regrowth so as to bury the waveguide and the grating.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
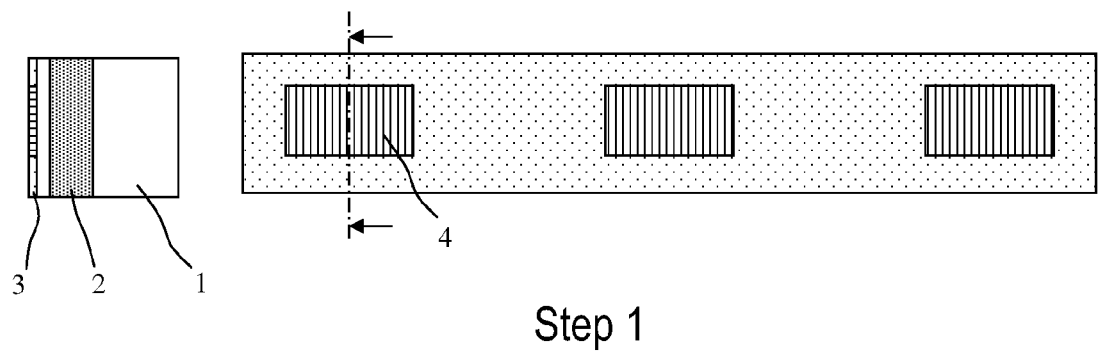
FIG. 1 shows the three broad steps in the production of a BRS structure according to the prior art.
Figure 1:
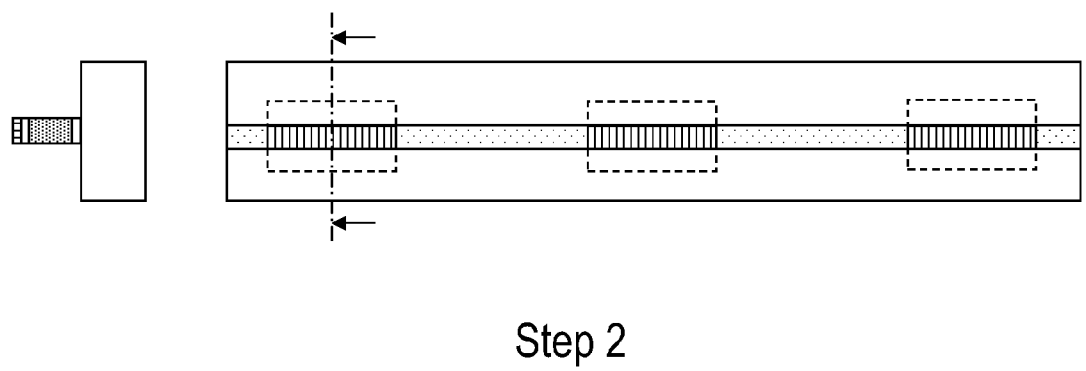
Figure 1:
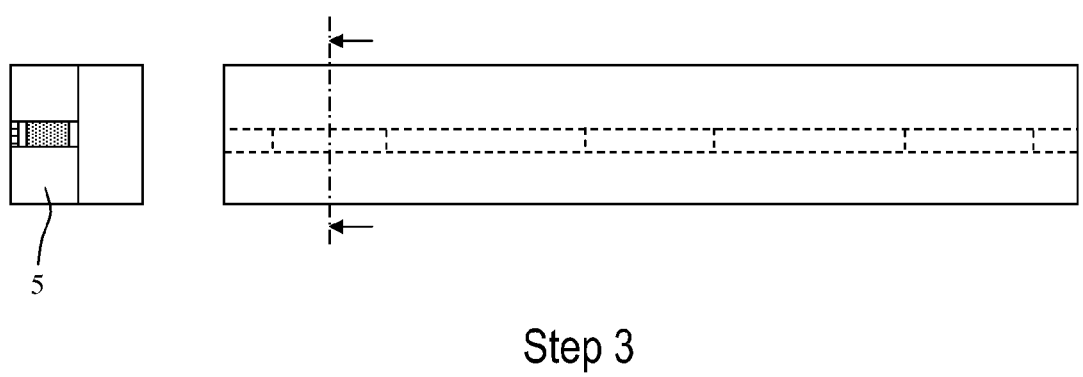
Figure 2:
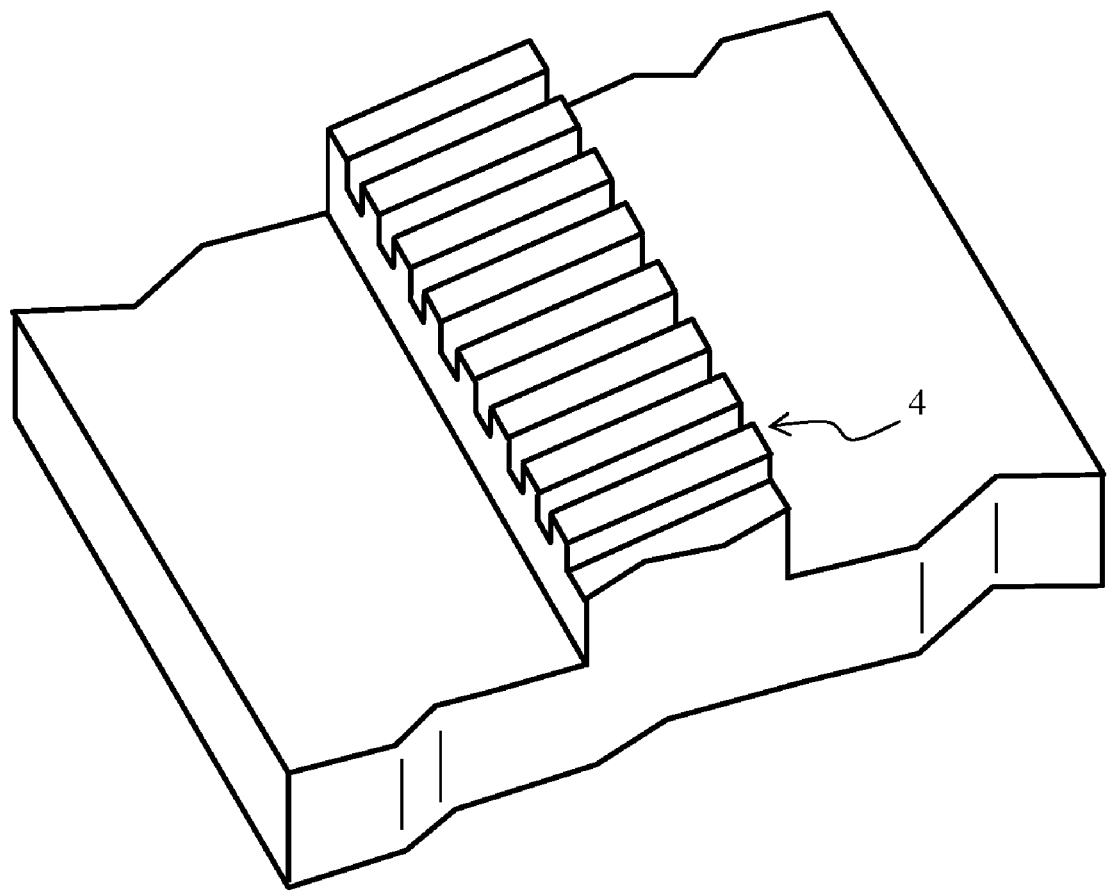
FIG. 2 shows a perspective view of the BRS structure according to the prior art at the end of the second step shown in FIG. 1.
Figure 3:
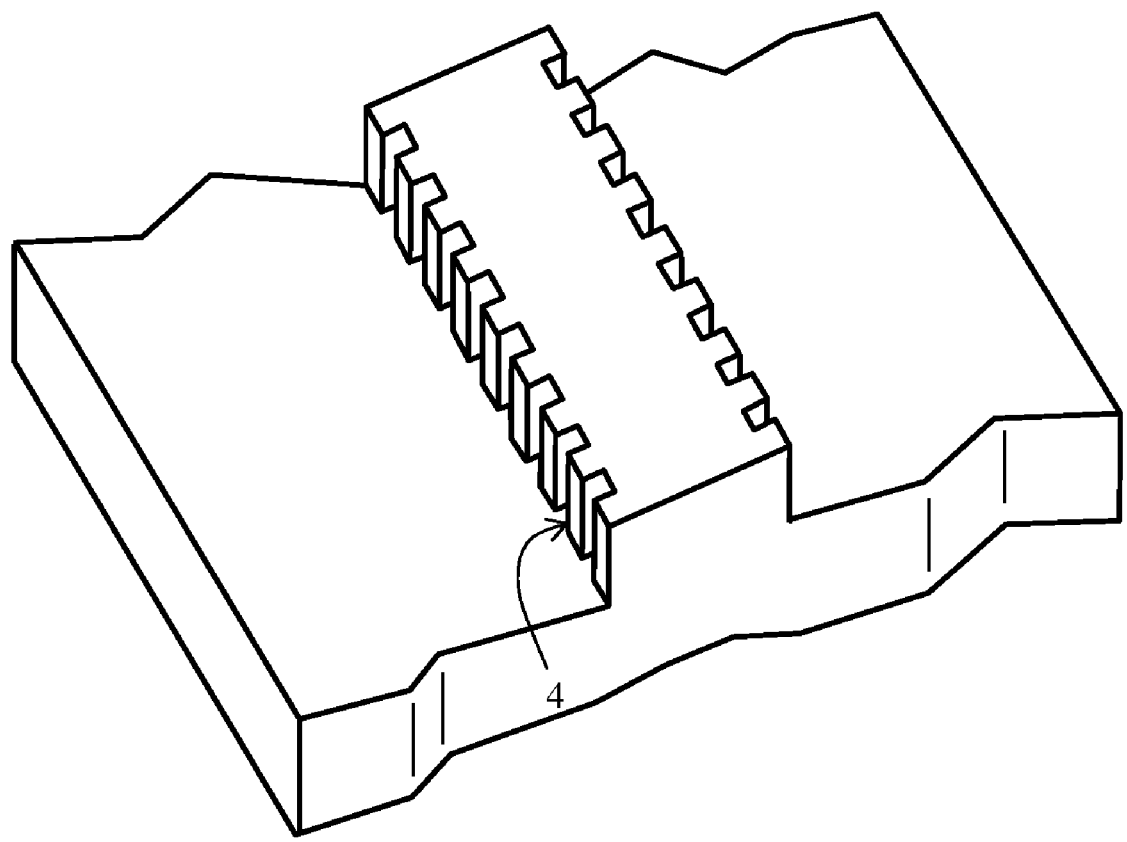
FIG. 3 shows a perspective view of the ridge structure according to an alternative embodiment of the prior art.
Figure 4:
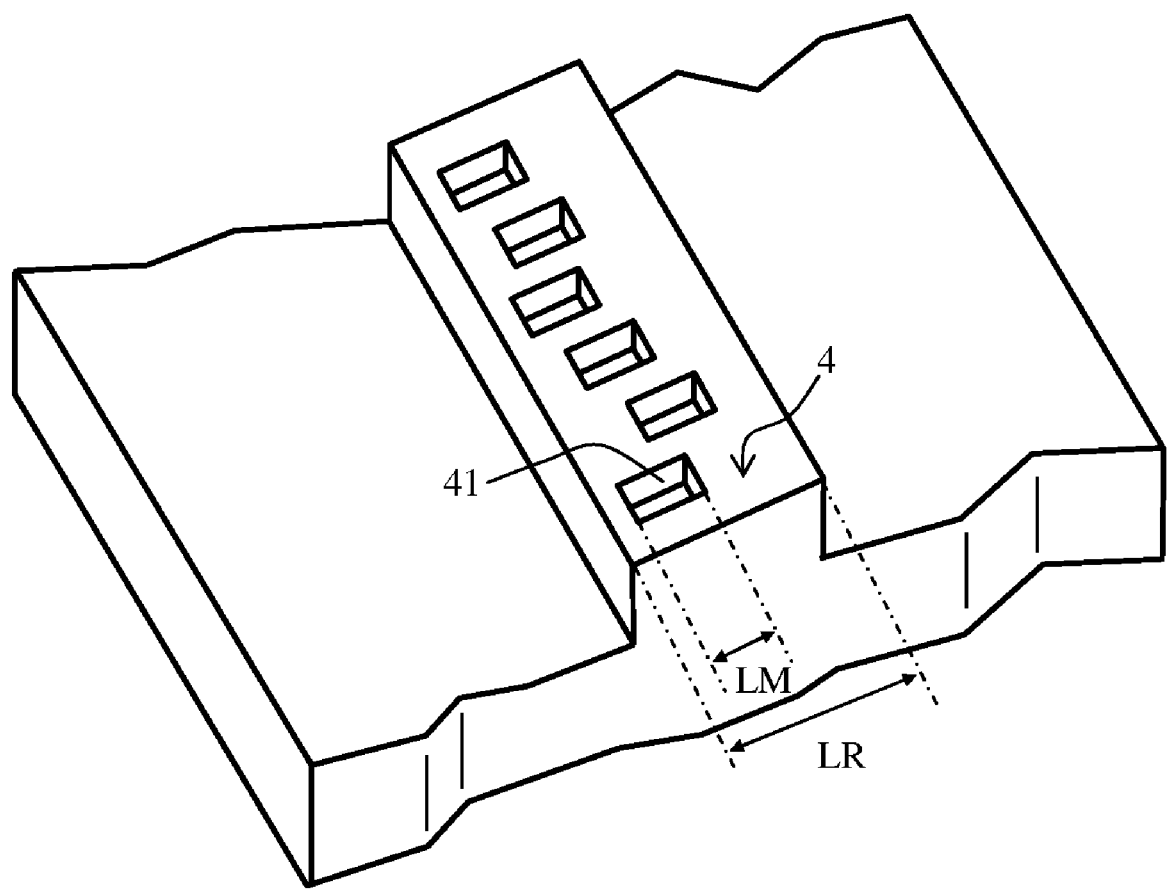
FIG. 4 shows a perspective view of the BRS structure according to the invention during its production process.

FIG. 4 shows a perspective view of a BRS structure according to the invention in which, for the sake of clarity, the upper layers have been removed so as to reveal the diffraction grating 4.

The grating layer is in the form of an elongate stripe comprising features 41, each feature 41 having an approximately rectangular shape. The length of the feature is approximately perpendicular to the length direction of the stripe of the grating layer. The length LM of certain features is substantially less than the width LR of the stripe of the waveguide layer.

Starting from this basic arrangement, many possible configurations exist. A number of configurations are shown in FIGS. 5 to 13 as non-limiting examples. For the sake of simplicity, and to bring out the variations in structure, these figures show only the gratings 4 in top view. For the sake of clarity, the features 41 are always shown as rectangular shapes. Of course, the processes used to produce these features may result in substantially different shapes, such as oblong or rounded shapes.

Figure 5:
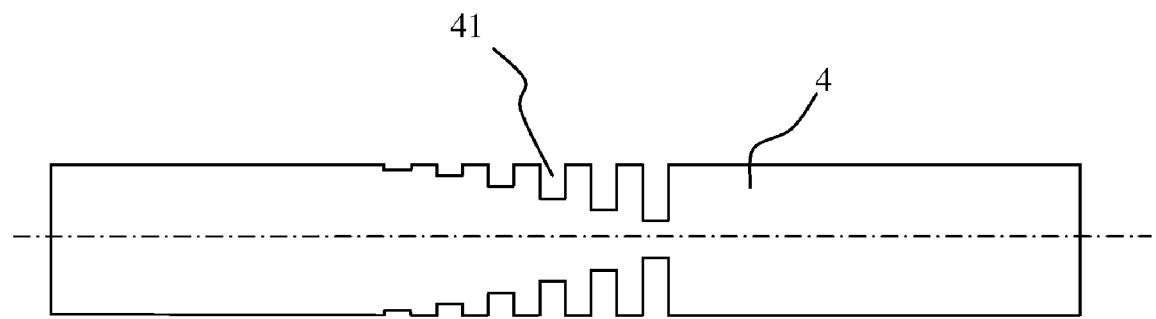
FIGS. 5 to 13 show top views of the grating according to the invention in various possible configurations.

FIG. 5 shows a grating 4 in which the features 41 are recesses produced on the periphery of the grating layer, the layer thus having indentations. As shown in FIG. 5, these indentations may vary in length. In the case of FIG. 5, the length the indentations varies linearly, but other variations are possible. Fine modulation of the coupling coefficient, for coupling between the grating and the waveguide along the latter, is then possible.

Figure 6:
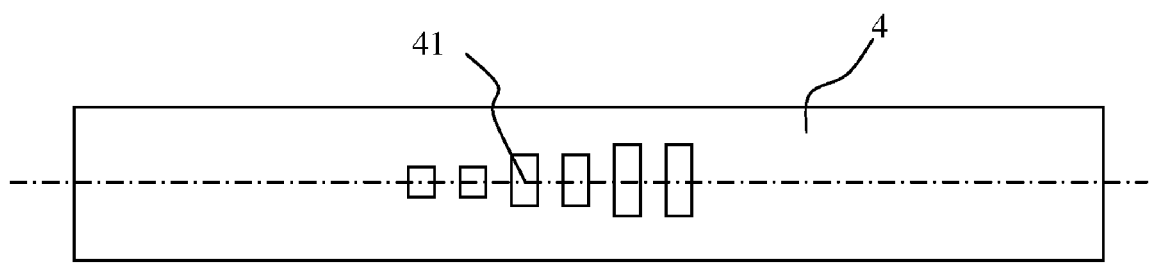

In FIG. 6, the features 41 are recesses produced inside the grating layer. Here again, by playing with the length of the features, it is possible to modulate the coupling coefficient, for coupling between the grating and the waveguide along the latter.

The gratings in FIGS. 5 and 6, which allow fine modulation of the coupling coefficient, are particularly suited for DFB lasers. This is because the longitudinal distribution of the optical intensity within a laser depends strongly on the product K×L, where K is the coupling coefficient and L is the length of the laser. A high K×L leads to a large concentration of photons at the centre of the cavity. In contrast, a low K×L results in the photons being concentrated at the ends of the cavity. Now, monomode emission can be sustained only if a uniform photon density distribution is established in the cavity. By producing a grating with a variable coupling coefficient it is possible to fabricate this type of structure.

Figure 7:
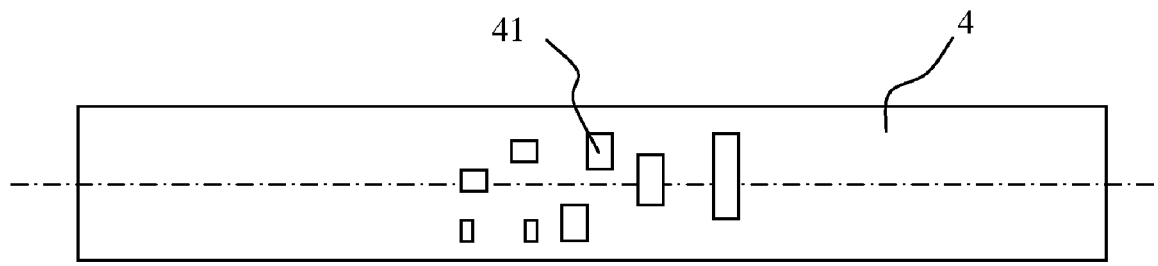

FIG. 7 shows a grating in which the rectangular features 41 are recesses varying in shape both along the longitudinal direction and in the transverse direction of the stripe, the pitch separating the various features also being variable. In this way, very complex modulations of the coupling coefficient may be obtained.

Figure 8:
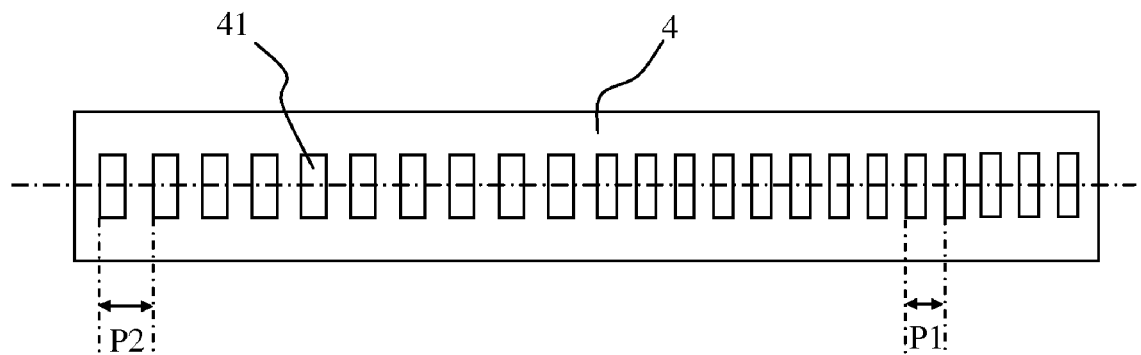

FIG. 8 shows a grating 4 in which the recesses 41 have a variable pitch P, the pitch P1 of the features being smaller on the right-hand side of the figure than the pitch P2 on the left-hand side of FIG. 8. By means of this arrangement, it is possible to produce DBR grating components that reflect at two different wavelengths.

Figure 9:
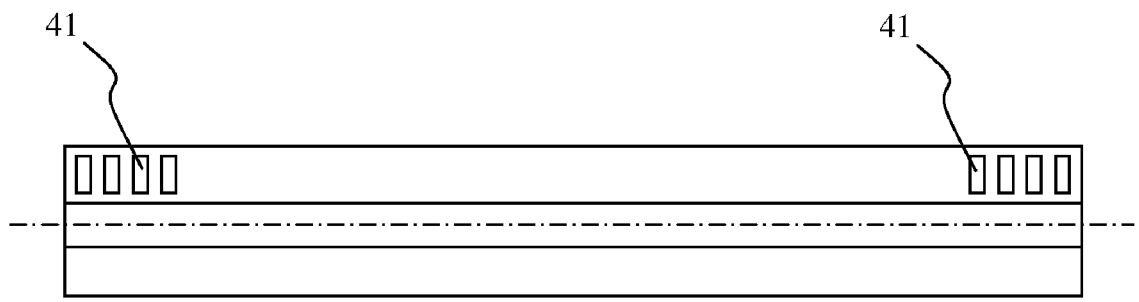

FIG. 9 shows a grating in which the features 41 are concentrated at the ends of the component. In this way it is possible to obtain a very high reflection coefficient over a short section located at the ends of the component. This type of grating may especially be used in SOA amplifiers. Thus, the wave passing through the SOA undergoes multiple round trips in the waveguide coupled to the grating, significantly increasing its amplification.

Figure 10:
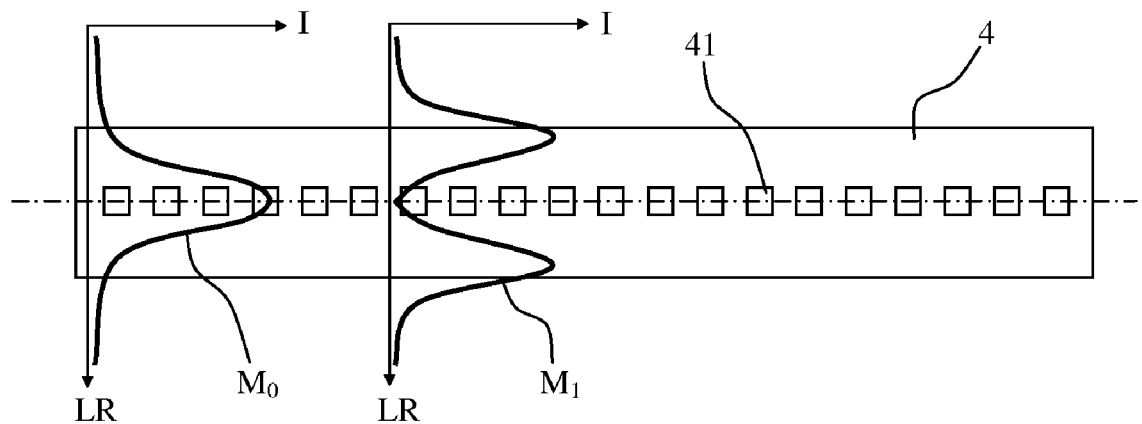

FIG. 10 shows a grating 4 possessing a row of features 41 that are all identical and centred on the central axis of the grating. The length of the features is smaller than the width of the grating. The benefit of this type of grating is that it offers the possibility of producing a different coupling depending on the order of the mode propagating in the waveguide. The indentations at the centre of the waveguide give preference to coupling on the fundamental mode, resulting in a larger width limit for monomode operation. This is because, as indicated in FIG. 10, which shows the variation in light intensity I of the fundamental mode $M_0$ plotted in bold as a function of the width LR of the waveguide, the energy of the fundamental mode is a maximum at the centre of the waveguide. Conversely, as also shown in FIG. 10, the energy of the 1st-order mode $M_1$ is a minimum at the centre of the grating and a maximum at the edges. This mode will therefore not be given preference by the grating. When the component is a DFB laser, the cut-off width of the monomode waveguide is considerable broadened. Thus, the maximum emission power of the laser is increased. Of course, it would be possible to give preference to a mode other than the fundamental mode. All that would be required is to place the features on the energy maxima of the mode. Thus, indentations along the edges of the waveguide will give preference to coupling on the $2^{nd}$-order mode.

Figure 11:
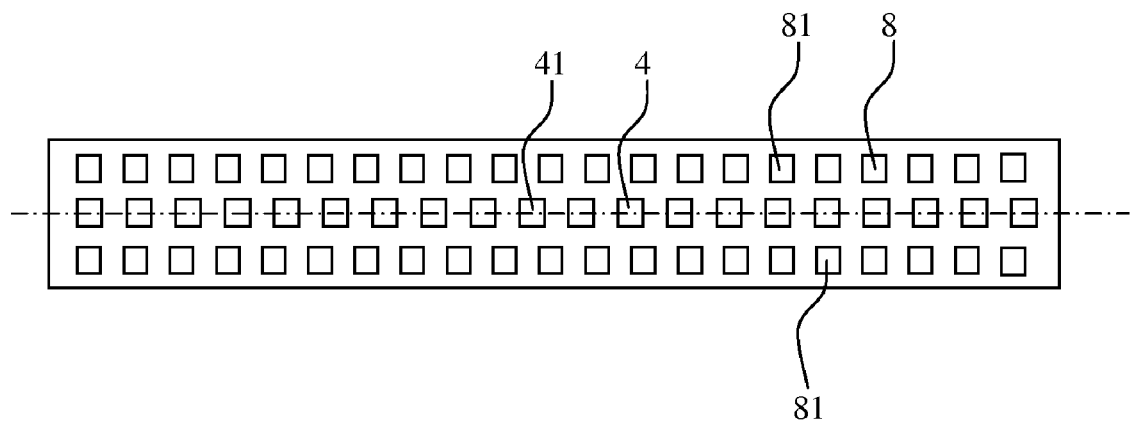

FIG. 11 shows a set of two gratings 4 and 8 produced in the same grating layer. The first grating 4 consists of a row of features 41 that are all identical and centred on the central axis of the grating layer. The features of this first grating have a first pitch. The second grating 8 consists of two rows of features 81 that are all identical and located symmetrically on the periphery of the grating layer. The features of this second grating have a second pitch, different from the first pitch. Thus, a bimodal waveguide may be produced. The first grating promotes coupling on the fundamental mode of a first wave while the second grating promotes coupling on the $1^{st}$-order mode of a second wave.

Figure 12:
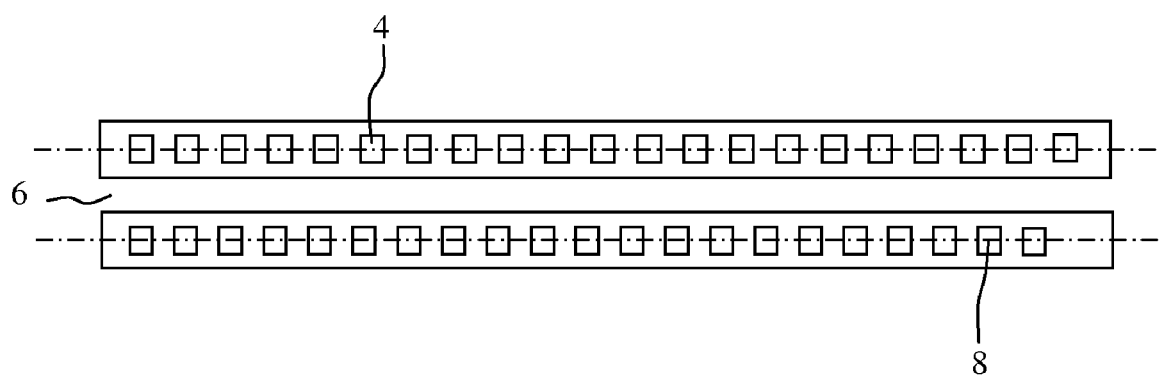

FIG. 12 shows a set of two gratings 4 and 8 produced in the same grating layer and separated by a central groove 6. If the gratings thus produced have different pitches, it is possible to guide, in parallel, two different optical modes on each grating, each mode being guided by one of the gratings.

Figure 13:
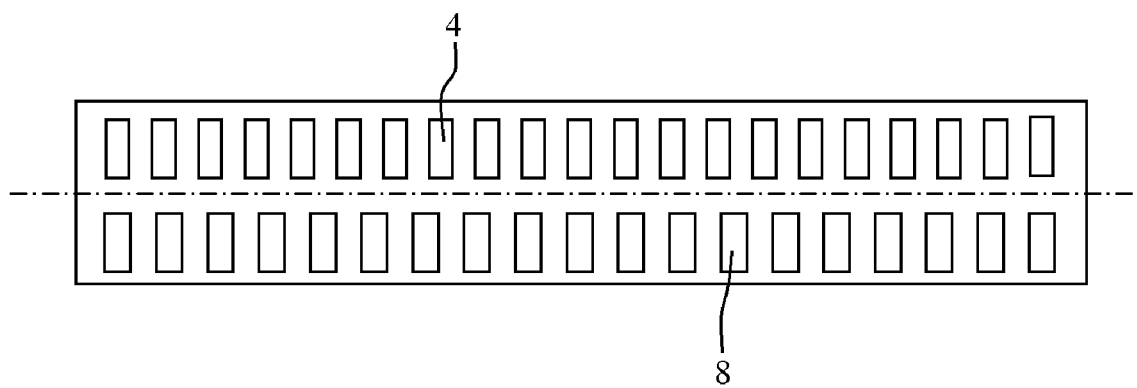

FIG. 13 shows a set of two gratings 4 and 8 produced in the same grating layer. Each grating consists of a row of features that are all identical but the pitches of the two gratings are different. With gratings of this type, it is possible to produce lasers that emit at two different wavelengths. It would be possible to produce the same function with a single row of features. In this case, the row would possess two sections, the first with a first pitch and the second with a second pitch different from the first pitch.

Of course, there are many possible alternative embodiments of gratings similar to those described above. A person skilled in the art will know how to adapt these configurations according to the desired characteristics of the final component, without any particular difficulty.

Figure 14:
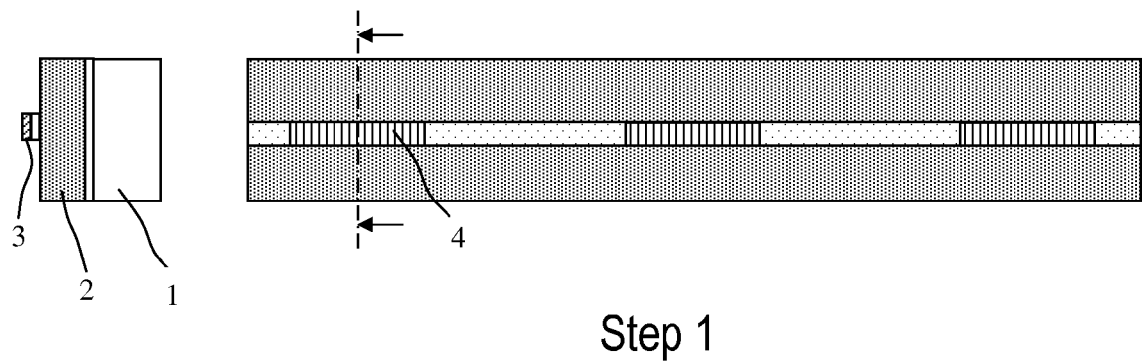
FIG. 14 shows the three broad steps in producing a BRS structure according to the invention.
Figure 14:
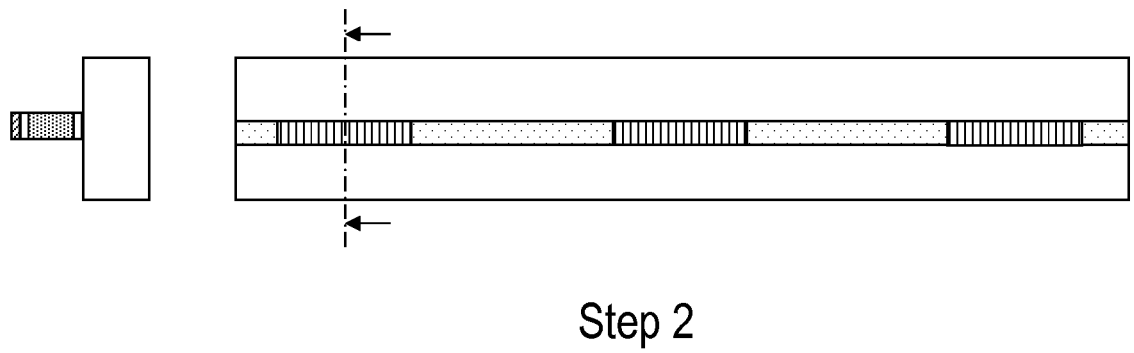
Figure 14:
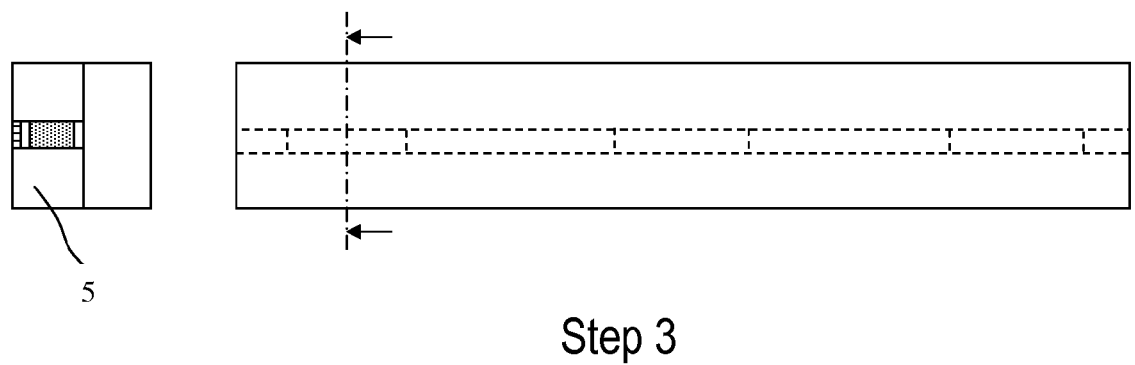

The process for producing, with a BRS structure, a device according to the invention is described in FIG. 14. It comprises three essential steps.

In the first step, the waveguide layer 2 is deposited on the substrate 1, followed by the grating layer 3, and then the waveguide/grating assembly is etched so as to produce the recesses of the grating. Electron lithography techniques, also called E-beam etching, may be used. These techniques make it possible to achieve very fine etching, with a precision of a few nanometres, and permit great freedom in the geometrical design of the features.

In the second step, a photoresist is used to protect just the grating zone. The etching of the waveguide is then continued down to the substrate.

In the third step, conventional epitaxial regrowth of a suitable material 5 is carried out so as to bury the waveguide. Thus, optical guiding and electrical injection may be provided.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. An optoelectronic device comprising: a buried waveguide in the form of an elongate stripe and grating layer in the form of an elongate stripe having features, each feature having an approximately rectangular shape, the length of the features being substantially perpendicular to the length direction of the grating layer, said layer being placed so as to provide optical coupling with an optical wave propagating in the waveguide, wherein the length of certain features is substantially less than the width of the waveguide, the grating layer comprising at least two rows of features, the axes of said rows being parallel to the central axis of the grating layer.

2. The optoelectronic device according to claim 1, wherein the features are recesses produced within the grating layer.

3. The optoelectronic device according to claim 1, wherein the features are recesses produced on the periphery of the grating layer, the layer thus having indentations.

4. The optoelectronic device according to claim 1, wherein the features are of variable size.

5. The optoelectronic device according to claim 1, wherein the features are placed symmetrically with respect to the central axis of the grating layer.

6. The optoelectronic device according to claim 1, wherein the features are placed asymmetrically with respect to the central axis of the grating layer.

7. The optoelectronic device according to claim 1, wherein the grating layer comprises at least three rows of features, the axes of said rows being parallel to the central axis of the grating layer.

8. The optoelectronic device according to claim 1, wherein the features of all the rows are of identical shape.

9. The optoelectronic device according to claim 1, wherein the pitch separating two consecutive features is constant in each row.

10. The optoelectronic device according to claim 9, wherein the pitch separating two consecutive features of a first row is different from the pitch separating two consecutive features of a second row.

11. A process for producing a device in bridge ridge stripe (BRS) technology, according to claim 1, which includes a substrate, comprising at least the following three steps:
   deposition of the waveguide layer on the substrate, deposition of the grating layer and then etching of the grating;
   exclusive protection of the grating region and continuation of the etching of the waveguide down to the substrate; and
   epitaxial regrowth so as to bury the waveguide and the grating.

* * * * *